United States Patent
Zhou et al.

(10) Patent No.: US 9,969,922 B2
(45) Date of Patent: May 15, 2018

(54) DEGRADABLE MATERIALS FOR OIL AND GAS FIELD OPERATIONS AND THEIR SYNTHESIS METHOD

(71) Applicants: China University of Petroleum—Beijing, Beijing (CN); KMS OIL FIELD CHEMICALS & TECHNICAL SERVICES LTD. BEIJING, Beijing (CN)

(72) Inventors: Fujian Zhou, Beijing (CN); Zhipeng Zhou, Beijing (CN); Min Wang, Beijing (CN); Jie Zuo, Beijing (CN); Cuihong Zhou, Beijing (CN)

(73) Assignees: China University of Petroleum-Beijing, Beijing (CN); KMS Oil Field Chemicals & Technical Services Ltd. Beijing, Beijing (CN)

( * ) Notice: Subject to any disclaimer, the term of this patent is extended or adjusted under 35 U.S.C. 154(b) by 48 days.

(21) Appl. No.: 15/209,465

(22) Filed: Jul. 13, 2016

(65) Prior Publication Data
US 2017/0015889 A1 Jan. 19, 2017

(30) Foreign Application Priority Data

Jul. 13, 2015 (CN) .......................... 2015 1 0408777

(51) Int. Cl.
*C09K 8/00* (2006.01)
*C09K 8/42* (2006.01)
(Continued)

(52) U.S. Cl.
CPC .............. *C09K 8/426* (2013.01); *C08J 3/005* (2013.01); *C08J 3/12* (2013.01); *C08J 3/201* (2013.01);
(Continued)

(58) Field of Classification Search
CPC ..... C08J 3/005; C08J 3/12; C08J 3/201; C08J 2367/04; C08J 2367/02; C09K 8/426;
(Continued)

(56) References Cited

U.S. PATENT DOCUMENTS

2010/0261828 A1* 10/2010 Tomoda .................. C08L 69/00
524/449
2012/0202928 A1* 8/2012 Loos ....................... C08L 67/02
524/96
(Continued)

FOREIGN PATENT DOCUMENTS

| CN | 102558793 A | * | 7/2012 | ........... B29C 47/385 |
| CN | 103113730 | | 5/2013 | |
| KR | 20130109707 A | * | 10/2013 | .............. C08L 67/04 |

OTHER PUBLICATIONS

Zhou et al, CN 102558793 A machine translation in English, Jul. 11, 2012 (Year: 2012).*
(Continued)

*Primary Examiner* — David T Karst
(74) *Attorney, Agent, or Firm* — Loza & Loza, LLP; Michael F. Fedrick

(57) ABSTRACT

A synthesis method for degradable material(s) (DM) which can be used in oil and gas field operations. The method involves using two, three, four or five polymer and chain extenders, including poly glycolic acid (PGA), polycaprolactone (PCL), polylactic acid (PLA), poly (butylene succinate) (PBS) and poly(3-hydroxybutyrate) (PHA), to synthesize a "resin alloy" through the melt mixing reaction method, which can be used in oil and gas field operations. The proposed DM can be prepared into flake, powder, granules, and ball shapes, or by one of the pure PGA, PCL, PLA, PBS and PHA, into flake, powder, granule and ball shapes, which can be further used in all kinds of operations (drilling, well completion, workover and acidizing fractur-
(Continued)

ing) in oil and gas fields, such as temporary plugging to protect a reservoir, temporary plugging of perforation holes, construction intervals, etc. The DMs are fully degradable and cause almost no damage to formations.

15 Claims, 1 Drawing Sheet

(51) Int. Cl.
| | |
|---|---|
| C08J 3/12 | (2006.01) |
| C08J 3/00 | (2006.01) |
| C08J 3/20 | (2006.01) |
| D01F 6/92 | (2006.01) |
| E21B 33/138 | (2006.01) |
| E21B 43/26 | (2006.01) |
| D01F 1/10 | (2006.01) |
| B29C 45/00 | (2006.01) |
| B29C 39/00 | (2006.01) |
| B29C 39/42 | (2006.01) |
| B29K 67/00 | (2006.01) |
| B29B 9/06 | (2006.01) |

(52) U.S. Cl.
CPC ............... *D01F 1/10* (2013.01); *D01F 6/92* (2013.01); *E21B 33/138* (2013.01); *E21B 43/26* (2013.01); *B29B 9/06* (2013.01); *B29C 39/003* (2013.01); *B29C 39/42* (2013.01); *B29C 45/0001* (2013.01); *B29K 2067/00* (2013.01); *B29K 2067/043* (2013.01); *B29K 2067/046* (2013.01); *B29K 2995/006* (2013.01); *C08J 2367/02* (2013.01); *C08J 2367/04* (2013.01); *C09K 2208/08* (2013.01); *D10B 2331/041* (2013.01); *D10B 2401/04* (2013.01)

(58) Field of Classification Search
CPC ......... C09K 2208/08; D01F 6/92; D01F 1/10; E21B 33/138; E21B 43/26; B29C 45/0001; B29C 39/003; B29C 39/42; D10B 2331/041; D10B 2401/04; B29K 2067/00; B29K 2995/006; B29K 2067/043; B29K 2067/046; B29B 9/06
USPC ......................................................... 523/130
See application file for complete search history.

(56) References Cited

U.S. PATENT DOCUMENTS

| 2013/0192779 A1* | 8/2013 | Parker | C08G 63/6886 |
| | | | 162/146 |
| 2013/0210949 A1* | 8/2013 | Scholl | C08L 23/02 |
| | | | 521/143 |
| 2013/0345363 A1* | 12/2013 | Donnelly | C08L 67/04 |
| | | | 525/190 |
| 2014/0163178 A1* | 6/2014 | Sohn | C08G 63/823 |
| | | | 525/440.12 |

OTHER PUBLICATIONS

Park et al., KR 20130109707 A machine translation in English, Oct. 8, 2013 (Year: 2013).*
First Office Action dated Jul. 22, 2016 for counterpart Chinese patent application No. 201510408777.6.
Search Report dated Jul. 22, 2016 for counterpart Chinese patent application No. 201510408777.6.

* cited by examiner

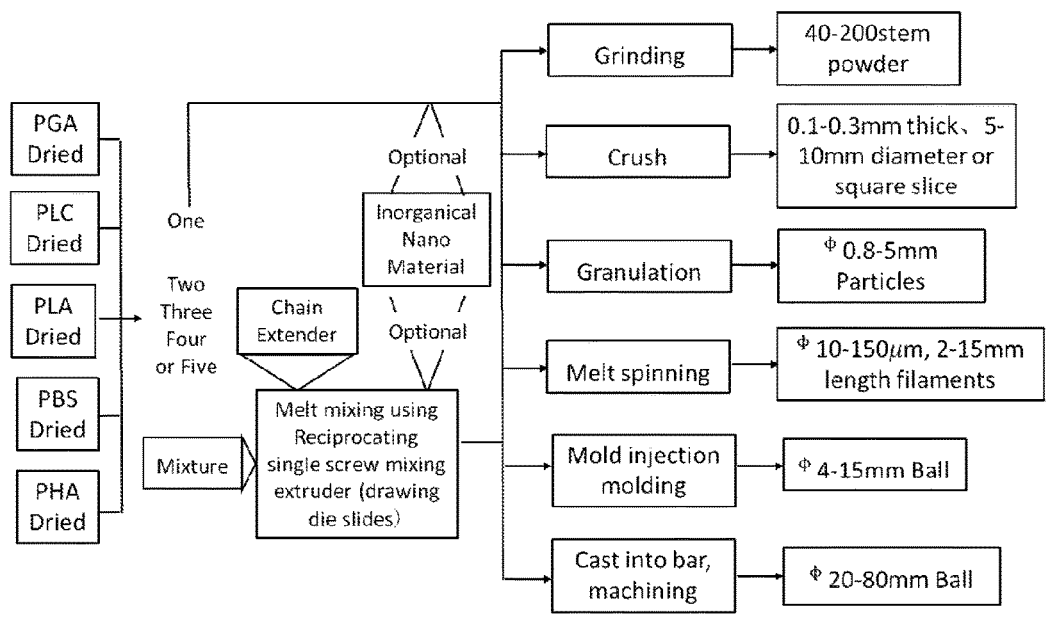

DEGRADABLE MATERIALS FOR OIL AND GAS FIELD OPERATIONS AND THEIR SYNTHESIS METHOD

TECHNICAL FIELD

This invention relates to the degradable material(s) used in oil and gas field operations and its preparation method. This invention pertains to the field of oil and gas exploitation.

BACKGROUND ART

In oil and gas field operations, such as drilling, completion, workover and stimulation (acidizing and fracturing), fluid-loss-control materials (FLCM) are widely used to mitigate formation damage due to the invasion of operation fluids. FLCM can be used to plug pore throat and fractures of the formation and further reduce the invasion of operation fluid into the formation. Regarding to the well penetrated multi layers or acidizing and fracturing of horizontal well, the whole well should be homogeneous acidized or staged fracturing stimulation. One of the most commonly and economically used technologies are temporary plugging acidizing and temporary plugging fracturing. Temporary plugging materials are used to seal the acidized or fractured layers which can prevent the subsequent acid or fracture fluid entering to the acidized or fractured layers, and help to continue the acidizing or fracturing of new layers or sections. These temporary plugging materials can also prevent the formation damage due to the invasion of the formation fluid from reservoir to wellbore.

In order to mitigate the formation damage due to the FLCM or plugging materials, temporary plugging materials (TPM) are usually preferred. TPM will dissolve, degrade and finally disappear after the well operations, which is the goal of petroleum engineers.

There are three types of TPMs including water soluble TPM, acid soluble TPM and oil soluble TPM. Two types of water soluble TPM are usually used, which are water soluble polymer (polyacrylamide, polyvinyl alcohol) and water soluble inorganic salts (potassium chloride, sodium chloride, etc.) mainly used in saturated salt water systems. Acid soluble TMP mainly contains calcium carbonate particles which can be removed by hydrochloric acid after the operations. Oil soluble TPM is resin material, such as C6-C10 resin, asphalt, etc.

The TPMs discussed in the previous section have some drawbacks and limitations. Water soluble TPM requires organic hydrocarbon rather than water as carrying liquid, which would increase the cost of operations and the risk of fire control. It is also required that there is enough water in the formations in the subsequent process which can solve the water soluble TPM, release the temporary plugging section and flow channel of oil and gas. If the formation water is not enough or the formation pressure is so low that cannot drive the water to the temporary plugging sections, additional water is need to be injected into the formation to solve the temporary plugging material. It is common that the injected water cannot solve the temporary plugging material completely and cause additional formation damage. It is required to inject acid to solve the acid soluble TPM and release the plugging after operations. It is not suitable for the acid sensitive formations, while for the non-acid sensitive formations another operation is required and the cost is increased. Some of the acid soluble TPM cannot completely solve even acid is injected. The well tubing will be eroded while injecting the acid into the formation. The oil soluble TPM is not suitable for gas wells and even for oil wells, since the can only contact with the frontier of the temporary plugging section, when formation oil is saturated with the oil soluble TPM, convection and diffusion are dominated resulting in slow dissolve effect which can be considered as another type of formation damage.

Considering the drawbacks of the current TPMs, it is desirable to investigate a new formation temperature dependent TPM that can degrade automatically. The operation fluids are usually injected into the formation with surface temperature which is lower than the formation temperature, and the injected formation temperature would be lowered. It is required that the new TPM is not degradable at the formation temperature and can temporary plug the formation which would prevent the invasion of operation fluids migrating into the formation and mitigate the formation damage while controlling the amount of operation fluid and reducing the cost. The formation thermal energy would transfer to the temporary sections and the temperature of these sections would be increased. This new TPM will be fully degraded and release the gas and oil channel plugged before with zero formation damage.

Different forms of TPMs are required according to the different reservoir characteristic as well as different requirements of field operations. The TPMs are needed to be made into proper shapes, such as granular, powder or fibrous. In the drilling and completion process, it is required to use 1-10 mm diameter particles to seal the leakage pathways in the large cracks; it is required to use 1-100 μm diameter powder and 0.5-1 mm slice to seal the micro fracture; it is required to use different size of granular and fibrous to seal the long well segment with various permeability contrast coefficient in the process of homogeneous acidification. According to multi-section or multi-layer transverse fracturing, it is required to use different size granular and fibrous TPMs. It is required to use suitable ball shape TPM to seam the perforation holes, while larger diameter ball shape TPM is preferred to use in sliding sleeves during the multi hydraulic fracturing.

The well temperatures are different due to the well depth, for example, the most productive zone of DaQing field is from 1000 to 1600 m, and the well bottom temperature is 50-60° C., while in the Tarim field, the well depth of the gas fields such as center Tarim, north Tarim and Kuqa mountain are 5000-8000 m, the bottom temperature is 130-180° C. Considering this situation, it is required that the degradable materials can be degraded at different temperatures.

SUMMARY OF INVENTION

In order to solve the problem discussed previously, this invention aims to provide the degradable material(s) and its synthesis method for oil and gas field operations. The proposed degradable material is a new material that can be degradable under reservoir temperatures. It will temporarily plug the formation while avoid formation damage in different types of oil and gas field operations.

In order to achieve this goal, this invention provides a synthesis method of the degradable material(s) for oil and gas field operations, comprising:

synthesize the polymers and chain extender by melt mixing reaction under nitrogen protection and get the resin alloy which is the degradable material used in the oil and gas field operations; wherein the polymers mainly include two, three, four or five of poly glycolic acid (PGA), polycaprolactone (PCL), polylactic acid (PLA), poly (butylene succinate) (PBS) and poly(3-hydroxybutyrate) (PHA).

According to the synthesis method mentioned previously, the polymers can be prepared by two of the PGA, PCL, PLA, PBS and PHA. The following compositions are measured by mass, and 10 types in total: 10-90% of the PGA and 10-90% of PCL (total percentage or the two is 100%, and the same rules in the following combinations); 10-90% of the PGA and 10-90% of the PLA; 10-90% of the PGA and 10-90% of PBS; 10-90% of the PGA and 10-90% of PHA; 10-90% of the PCL and 10-90% of PLA; 10-90% of the PCL and 10-90% of PBS; 10-90% of the PCL and 10-90% of the PHA; 10-90% of the PLA and 10-90% of PBS; 10-90% of the PLA and 10-90% of PHA;10-90% of the PBS and 10-90% of PHA.

Or the polymers can be prepared by three of the PGA, PCL, PLA, PBS and PHA. The following compositions are measured by mass, and 10 types in total: 10-50% of the PGA, 10-40% of PCL and 10-50% of PLA (total percentage of the three is 100%, and the same rules in the following combinations); 10-40% of the PGA, 10-50% of PCL and 10-40% of PBS; 10-40% of the PGA, 10-50% of PCL and 10-40% of PHA; 10-40% of the PGA, 10-50% of PLA and 10-40% of PBS; 10-40% of the PGA, 10-40% of PLA and 10-40% of PHA; 10-50% of the PGA, 10-40% of PBS and 10-40% of PHA; 10-40% of the PCL, 10-50% of PLA and 10-40% of PBS; 10-40% of the PCL, 10-50% of PLA and 10-40% of PHA; 10-60% of the PCL, 10-30% of PBS and 10-30% of PHA; 10-60% of the PLA, 10-30% of PBS and 10-30% of PHA.

Or the polymers can be prepared by four of the PGA, PCL, PLA, PBS and PHA. The following compositions are measured by mass, and 5 types in total: 10-40% of the PGA, 10-40% of PCL, 10-40% of PLA and 10-30% of PBS (total percentage or the two is 100%, and the same rules in the following combinations); 10-40% of the PGA, 10-40% of PCL, 10-40% of PLA and 10-30% of PHA; 10-40% of the PCL, 10-40% of PLA and 10-30% of PBS and 10-30% of PHA; 10-40% of the PGA, 10-40% of PLA, 10-30% of PBS and 10-30% of PHA; 10-40% of the PGA, 10-40% of PCL, 10-30% of PBS and 10-30% of PHA.

Or the polymers can be prepared by the PGA, PCL, PLA, PBS and PHA. The following compositions are measured by mass, 10-40% of the PGA, 10-40% of PCL, 10-40% of PLA, 10-30% of PBS and 10-30% of PHA (total percentage or the two is 100%, and the same rules in the following combinations).

Choose tow from the PGA, PCL, PLA, PBS and PHA (PGA/PCL, PGA/PLA, PGA/PBS, PGA/PHA, PCL/PLA, PCL/PBS, PCL/PHA, PLA/PBS, PLA/PHA, PBS/PHA, 10 in total), or three of the five (PGA/PCL/PLA, PGA/PCL/PBS, PGA/PCL/PHA, PGA/PLA/PBS, PGA/PLA/PHA, PGA/PBS/PHA, PCL/PLA/PBS, PCL/PLA/PHA, PCL/PBS/PHA, PLA/PBS/PHA, 10 in total), or four of the five 9 (PGA/PCL/PLA/PBS, PGA/PCL/PLA/PHA, PCL/PLA/PBS/PHA, PGA/PLA/PBS/PHA, PGA/PCL/PBS/PHA, 5 in total) or all the five (PGA/PCL/PLA/PBS/PHA) to react with the chain extender and synthesize the degradable material that can be further used in the oil and gas field operations.

According the synthesis method mentioned previously, the weight-average molecular weight (WAMW) of PGA is 5,000 to 150,000 (PGA slice is preferred); the WAMW of PCL is 5,000 to 150,000 (PCL slice is preferred); the WAMW of PLA is 5,000 to 150,000 (PLA slice is preferred); the WAMW of PBS is 5,000 to 250,000 (PBS slice is preferred); the WAMW of PHA is 5,000 to 80,000 (PHA slice is preferred).

In this invention, the WAMW of PGA is 5,000 to 150,000 and the molecules is

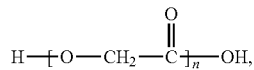

which contains glycolic acid repeat unit homopolymer $(-(O-CH_2-CO)-)$, hydroxyl and carboxyl are also included. The glass transition temperature (Tg) is around 36° C. The ester base of PGA can be fully degraded under reservoir temperature conditions in a relative faster degradation speed. The intermediate product is glycolic acid and the final products are carbon dioxide and water.

The WAMW of PCL is 5,000 to 150,000 and the molecules is

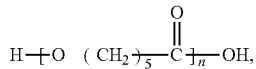

which contains repeat unit homopolymer $(-(O-CH_2-CO)-)$, hydroxyl and carboxyl are also included. The glass transition temperature (Tg) is around 60° C. and the melting point is 60° C. PCL is not suitable for the reservoir temperature higher than 60° C. in the oil and gas field operations.

The WAMW of PLA is 5,000 to 150,000 and the molecules is

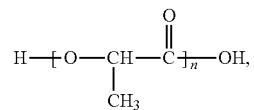

which contains repeat unit homopolymer

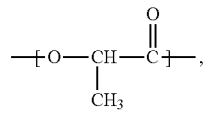

hydroxyl and carboxyl are also included. The melting point is 180-210° C. The ester base of PLA can be fully degraded under reservoir temperature conditions. The intermediate product is glycolic acid and the final products are carbon dioxide and water.

The WAMW of PBS is 5,000 to 250,000 and the molecules is

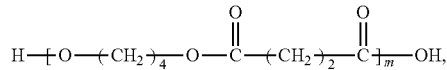

which contains repeat unit homopolymer

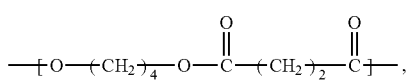

hydroxyl and carboxyl are also included. The melting point is 114° C. and the glass transition temperature (Tg) is −32° C. The ester base of PLA can be fully degraded under reservoir temperature conditions. The intermediate product is glycolic acid and the final products are carbon dioxide and water. PBS has a faster degradation rate under the reservoir temperature that is lower than 50° C.

The WAMW of PHA is 5,000 to 80,000 and the molecules is

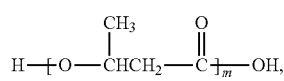

which contains repeat unit homopolymer

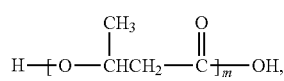

hydroxyl and carboxyl are also included. The melting point is 140-220° C. and the glass transition temperature (Tg) is 50° C. The ester base of PLA can be fully degraded under reservoir temperature conditions. The intermediate product is glycolic acid and the final products are carbon dioxide and water.

All of the PGA, PCL, PLA, PBS and PHA contain hydroxyl and carboxyl and can be degraded under reservoir temperature and reservoir water conditions. The final degradation products are carbon dioxide and water which will not contaminate reservoir rock and formation water.

According to the synthesis method mentioned previously, the following steps should be included: the polymer must be vacuum mixed and dried while holding the molecular weight of the polymer and the water content of PGA, PCL, PLA, PBS and PHA must be lower than 0.1% by weight. The optimized water content is lower than 0.01% by weight.

Further optimized operations are:

The PGA is vacuum mixed and dried at the temperature no higher than 120° C. (90-105° C. is preferred), the pressure is between 10 and 100 kPa, and the mixing and drying time is between 2 and 10 hours.

The PLC is vacuum mixed and dried at the temperature no higher than 60° C. (50-55° C. is preferred), the pressure is between 10 and 100 kPa, and the mixing and drying time is between 2 and 12 hours.

The PLA is vacuum mixed and dried at the temperature no higher than 105° C. (80-95° C. is preferred), the pressure is between 10 and 100 kPa, and the mixing and drying time is between 2 and 12 hours.

The PBS is vacuum mixed and dried at the temperature no higher than 90° C. (60-75° C. is preferred), the pressure is between 10 and 100 kPa, and the mixing and drying time is between 3 and 14 hours.

The PHA is vacuum mixed and dried at the temperature no higher than 105° C. (90-105° C. is preferred), the pressure is between 10 and 100 kPa, and the mixing and drying time is between 2 and 12 hours.

The total water content must be lower than 0.1% by weight, lower than 0.01% is preferred after the preprocessing operation, which would be benefit to the following melt mixing reaction.

According to the synthesis method mentioned previously, the chain extender contains the active epoxy group which includes one or more combinations of ADR-4300 (5 active epoxy group of each molecule), ADR-4370(9 active epoxy group of each molecule), ADR4368(9 active epoxy group of each molecule) and ADR-4380 (3 active epoxy group of each molecule) produced by BASF SE company. The added chain extender is 0.05-5.0% of the total polymer by weight. The added chain extender is 0.05-5.0% of the total polymer by weight. Further optimized result is 0.1 to 0.3% of the total polymer by weight.

This invention selects PGA, PCL, PLA, PBS and PHA as the basic raw materials of the degradable material, the end group of these forecasts are all hydroxyl and carboxyl which can react with the chain extender that contains active epoxy group (such as the products of BASF SE, ADR-4300, ADR-4370, ADR4368 and ADR 4380 with different numbers of active epoxy group). After linking, melting and mixing reactions, larger macromolecular polymer resin alloy is synthesized. Such as PGA, PCL and PLA can react with chain extender that contains active epoxy group, the reaction equation is shown below:

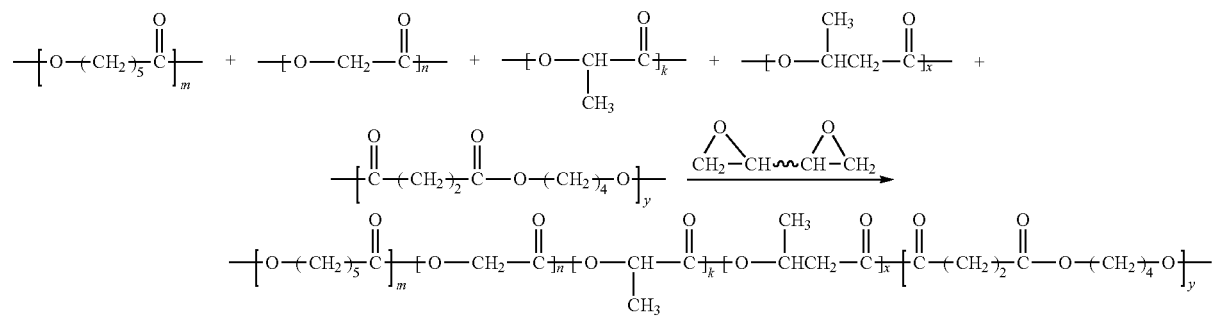

In this invention, two, three, four or five of the PGA, PCL, PLA, PBS and PHA can be selected to react with chain extender, or react with the mixture of chain extender and inorganic nano materials. The resin alloy or the nano resin alloy have new structures, and the mechanical and chemical properties are all changed. Multi inlayed structure can be synthesized by adjusting the proportion of each polymer, which have different strength and different degradation temperature. The synthesis degradable material can be used in different well depth and different operation goals.

According to the synthesis method mentioned previously, the melt-mixing temperature will change as the change of raw material proportions.

The melt mixing reaction temperature of the PGA and PCL is 200-300° C., optimized temperature is 205-220° C., and further optimized temperature is 205-210° C.

The melt mixing reaction temperature of the PGA and PLA is 200-240° C., optimized temperature is 210-230° C., and further optimized temperature is 215-220° C.

The melt mixing reaction temperature of the PGA and PBS is 205-240° C., optimized temperature is 210-230° C., and further optimized temperature is 210-220° C.

The melt mixing reaction temperature of the PGA and PHA is 200-240° C., optimized temperature is 210-230° C., and further optimized temperature is 210-220° C.

The melt mixing reaction temperature of the PCL and PLA is 200-230° C., optimized temperature is 205-220° C., and further optimized temperature is 205-210° C.

The melt mixing reaction temperature of the PCL and PBS is 115-145° C., optimized temperature is 120-135° C., and further optimized temperature is 120-130° C.

The melt mixing reaction temperature of the PCL and PHA is 200-230° C., optimized temperature is 210-230° C., and further optimized temperature is 205-215° C.

The melt mixing reaction temperature of the PLA and PBS is 205-240° C., optimized temperature is 210-230° C., and further optimized temperature is 210-220° C.

The melt mixing reaction temperature of the PLA and PHA is 205-240° C., optimized temperature is 210-230° C., and further optimized temperature is 210-220° C.

The melt mixing reaction temperature of the PBS and PHA is 205-235° C., optimized temperature is 210-230° C., and further optimized temperature is 210-220° C.

The melt mixing reaction temperature of the PGA, PCL and PLA is 200-230° C., optimized temperature is 205-220° C., and further optimized temperature is 205-210° C.

The melt mixing reaction temperature of the PGA, PCL and PBS is 200-230° C., optimized temperature is 205-220° C., and further optimized temperature is 205-210° C.

The melt mixing reaction temperature of the PGA, PCL and PHA is 200-230° C., optimized temperature is 205-220° C., and further optimized temperature is 205-210° C.

The melt mixing reaction temperature of the PGA, PLA and PBS is 200-230° C., optimized temperature is 205-220° C., and further optimized temperature is 205-210° C.

The melt mixing reaction temperature of the PGA, PLA and PHA is 200-230° C., optimized temperature is 205-220° C., and further optimized temperature is 205-210° C.

The melt mixing reaction temperature of the PGA, PBS and PHA is 200-230° C., optimized temperature is 205-220° C., and further optimized temperature is 205-210° C.

The melt mixing reaction temperature of the PCL, PLA and PBS is 200-230° C., optimized temperature is 205-220° C., and further optimized temperature is 205-210° C.

The melt mixing reaction temperature of the PCL, PLA and PHA is 200-230° C., optimized temperature is 205-220° C., and further optimized temperature is 205-210° C.

The melt mixing reaction temperature of the PCL, PBS and PHA is 200-230° C., optimized temperature is 205-220° C., and further optimized temperature is 205-210° C.

The melt mixing reaction temperature of the PLA, PBS and PHA is 200-240° C., optimized temperature is 210-230° C., and further optimized temperature is 210-220° C.

The melt mixing reaction temperature of the PGA, PCL, PLA and PBS is 200-230° C., optimized temperature is 205-220° C., and further optimized temperature is 205-210° C.

The melt mixing reaction temperature of the PGA, PCL, PLA and PHA is 200-230° C., optimized temperature is 205-220° C., and further optimized temperature is 205-210° C.

The melt mixing reaction temperature of the PCL, PLA, PBS and PHA is 200-230° C., optimized temperature is 205-220° C., and further optimized temperature is 205-210° C.

The melt mixing reaction temperature of the PGA, PLA, PBS and PHA is 205-240° C., optimized temperature is 210-230° C., and further optimized temperature is 210-220° C.

The melt mixing reaction temperature of the PGA, PCL, PBS and PHA is 200-230° C., optimized temperature is 205-220° C., and further optimized temperature is 205-210° C.

The melt mixing reaction temperature of the PGA, PCL, PLA, PBS and PHA is 200-230° C., optimized temperature is 205-220° C., and further optimized temperature is 205-210° C.

If the temperature is lower than the lower limit of the suggested reaction temperature, the raw materials would not fully react, while if the temperature is higher than the upper limit of the suggested reaction temperature, the synthesis resin alloy has the tendency of thermal decomposition.

According to the synthesis method mentioned previously, the melt mixing reaction time is 3-20 minutes, optimized time is 5-8 minutes. If the time is lower than the lower limit of the suggested reaction time, the raw materials would not fully react, while if the time is higher than the upper limit of the suggested reaction time, the color of the synthesis resin alloy would be deeper.

According to the synthesis method mentioned previously, the heating rate is 5-20 C./min, optimized time is heating rate is 7-15 C./min.

According to the synthesis method mentioned previously, the reciprocating single-screw intermixing extruder is used during the melt mixing reactions. The following steps are included: cut the resin alloy or the nano resin alloy into slice using wire drawing die (such as 3 mm drawing die) and after cooling (such as wind cooling), the cut slices are the DM which can be further used in field operations.

According to the synthesis method mentioned previously, the following steps are included: mix two, three, four, or five of the PGA, PCL, PLA, PBS and PHA at the mixer under vacuum condition. The mix temperature and mix time can be adjusted by the technical expert of this area. Then add the mixture to the reciprocating single-screw intermixing extruder and react with chain extender (or further with inorganic nano materials).

The resin alloy or the nano resin alloy can be manufactured into slices, powder, granule, ball and fiber shapes based on the requirement of reservoir conditions and operation goals, such as 20-80 mm diameter balls, 0.8-5 mm granules, 40-200 stems powders, 0.1-0 3 mm thick and 5-10 mm diameter or length of slide (square shape) slice and 10-150 μm diameter and 2-15 mm length fiber, etc.

According to the synthesis method mentioned previously, the following steps are included: crush the resin alloy, the nano resin alloy, one or some of the PGA, PCL, PLA, PBS and PHA (can be vacuum mixing dried), or one of the PGA, PCL, PLA, PBS, and PHA (can be vacuum mixing dried) with the inorganic nanomaterial as mentioned before into powder using plastic grinder and then cooling with liquid nitrogen; the grinding plate temperature is controlled between −10° C. to 0° C. Screen the powder to 40 mesh to 200 mesh (74-420 μm), and the powder are the DM which can be further used in field operations. This powder DM can be used to temporary plug the pore, throat and micro fractures of the formations in drilling fluid, completion fluid, workover fluid, well control fluid, acidizing fluid and hydraulic fracturing fluid, which would further lower the fluid loss and mitigate the formation damage of operation fluid.

According to the synthesis method mentioned previously, the following steps are included: pellet the resin alloy or the nano resin alloy that are not synthesized by PCL and PBS using pelletizer (wire drawing die can be used if needed) at the temperature of 160-205° C. (further optimized temperature is 160-190° C.); pellet the resin alloy or the nano resin alloy synthesized by PCL and PBS using pelletizer at the temperature of 110-120° C.; pellet the PCL (can be vacuum mixing dried) or the mixture of PCL (can be vacuum mixing dried) and inorganic nanomaterial using pelletizer at the temperature of 50-60° C.; pellet the PBS (can be vacuum mixing dried) or the mixture of PBS (can be vacuum mixing dried) and inorganic nanomaterial using pelletizer at the temperature of 110-120° C.; pellet one of the PGA, PLA and PHA (can be vacuum mixing dried) or the mixture of one of the PGA, PLA and PHA (can be vacuum mixing dried) with inorganic nanomaterial using pelletizer at the temperature of 160-190° C.; and then cool the pellet to 15-35° C. (cooling rate is 5-20° C./min). The diameter of the pellet is 0.8-1 mm, 1-1.5 mm, 1.5-2 mm, 2-2.5 mm, 2.5-3 mm or 3-5 mm. The pellet DM can be further used in field operations. The pellet DM can be used to temporary plug the fractures in the drilling and completion processes, and it can also be used to temporary plug the preexisted fractures and conduct transverse fracturing or temporary plug the preexisted fractures and conduct re-fracturing.

According to the synthesis method mentioned previously, the following steps are included: Crush (grinder can be used) the resin alloy or the nano resin alloy that are not synthesized by PCL and PBS to 0.1-0.3 mm thickness slices under the temperature of 160-190° C.; Crush (grinder can be used) the resin alloy or the nano resin alloy that are synthesized by PCL and PBS to 0.1-0.3 mm thickness slices under the temperature of 100-110° C.; Crush the PCL (can be vacuum mixing dried) or the mixture of PCL (can be vacuum mixing dried) and inorganic nanomaterial to 0.1-0.3 mm thickness slices under the temperature of 50-55° C.; Crush the PBS (can be vacuum mixing dried) or the mixture of PBS (can be vacuum mixing dried) and inorganic nanomaterial to 0.1-0.3 mm thickness slices under the temperature of 100-110° C.; Crush (grinder can be used) one of the PGA, PLA and PHA (can be vacuum mixing dried) or the mixture of one of the PGA, PLA and PHA (can be vacuum mixing dried) with inorganic nanomaterial to 0.1-0.3 mm thickness slices under the temperature of 160-190° C. Lower the temperature to 15-35° C. (cooling rate is 5-20° C./min), then crush (chipper machine can be used) the slice shape DM to cycle/likely cycle shape slice with diameter 5-10 mm or crush the slice shape DM to square shape/likely square shape/triangle shape slice with slide length 5-10 mm (can be irregular polygon flakes with the roughly the same size). The final slice shape DM can be further used in field operations.

According to the synthesis method mentioned previously, the following steps are included: Heat the resin alloy or the nano resin alloy that are not synthesized by PCL and PBS to the temperature of 190-210° C., then conduct the stretching-setting treatment at the temperature of 65-90° C. using treatment melt-spinning machine; Heat the resin alloy or the nano resin alloy synthesized by PCL and PBS to the temperature of 110-120° C., then conduct the stretching-setting treatment at the temperature of 40-60° C. using treatment melt-spinning machine; Heat the PCL (can be vacuum mixing dried) or the mixture of PCL (can be vacuum mixing dried) and inorganic nanomaterial to the temperature of 60-65° C., then conduct the stretching-setting treatment at the temperature of 30-40° C. using treatment melt-spinning machine; Heat the PBS (can be vacuum mixing dried) or the mixture of PBS (can be vacuum mixing dried) and inorganic nanomaterial to the temperature of 110-120° C., then conduct the stretching-setting treatment at the temperature of 40-60° C. using treatment melt-spinning machine; Heat one of the PGA, PLA and PHA (can be vacuum mixing dried) or the mixture of one of the PGA, PLA and PHA (can be vacuum mixing dried) with inorganic nanomaterial to the temperature of 190-210° C., then conduct the stretching-setting treatment at the temperature of 65-90° C. using treatment melt-spinning machine. The length of the fiber is 2-15 mm and the diameter of the fiber is 15-150 micron. The fiber DM can be further used in field operations. The fiber DM can be used to temporary plug the natural fractures in the drilling and completion processes. It can also be used to carry the proppant and seal the preexisted fractures which can help to form new fractures by the temporary plugging materials and improve the hydraulic fracture extent both in length and volume.

According to the synthesis method mentioned previously, the following steps are included: Heat the resin alloy or the nano resin alloy that are not synthesized by PCL and PBS to the temperature of 160-200° C. using the injection molding machine, produce the ball shaped DM with diameter 4-15 mm under the flowing conditions: constant crew speed 100-175 cycle/min, pressure 300-700 kPa, feeding inlet temperature 20-25° C., feeding temperature 150-160° C., metering section temperature 190-210° C., injection orifice temperature 190-210° C., mold temperature 20-25° C. (the injection rate can be faster). The ball shape DM can be further used in field operations.

Heat the resin alloy or the nano resin alloy that are synthesized by PCL and PBS to the temperature of 110-120° C. using the injection molding machine, produce the ball shaped DM with diameter 4-15 mm under the flowing conditions: constant crew speed 100-175 cycle/min, pressure 300-700 kPa, feeding inlet temperature 20-25° C., feeding temperature 100-110° C., metering section temperature 110-120° C., injection orifice temperature 110-120° C., mold temperature 20-25° C. (the injection rate can be faster). The ball shape DM can be further used in field operations;

Or heat the PCL (can be vacuum mixing dried) or the mixture of PCL (can be vacuum mixing dried) and inorganic nanomaterial to the temperature of 60-65° C. using the injection molding machine, produce the ball shaped DM with diameter 4-15 mm under the flowing conditions: constant crew speed 100-175 cycle/min, pressure 300-700 kPa, feeding inlet temperature 20-25° C., feeding temperature 55-60° C., metering section temperature 60-65, injection orifice temperature 58-62, mold temperature 20-25° C. (the injection rate can be faster). The ball shape DM can be further used in field operations.

Or heat the PBS(can be vacuum mixing dried) or the mixture of PBS(can be vacuum mixing dried) and inorganic nanomaterial to the temperature of 110-120° C. using the injection molding machine, produce the ball shaped DM with diameter 4-15 mm under the flowing conditions: constant crew speed 100-175 cycle/min, pressure 300-700 kPa, feeding inlet temperature 20-25° C., feeding temperature 100-110° C., metering section temperature 110-120° C., injection orifice temperature 110-120° C., mold temperature 20-25° C. (the injection rate can be faster). The ball shape DM can be further used in field operations;

Or heat one of the PGA, PLA and PHA (can be vacuum mixing dried) or the mixture of one of the PGA, PLA and PHA(can be vacuum mixing dried) with inorganic nanomaterial to the temperature of 160-200° C. using the injection molding machine, produce the ball shaped DM with diameter 4-15 mm under the flowing conditions: constant crew speed 100-175 cycle/min, pressure 300-700 kPa, feeding inlet temperature 20-25° C., feeding temperature 150-160° C., metering section temperature 190-210° C., injection orifice temperature 190-210° C., mold temperature 20-25° C. (the injection rate can be faster). The ball shape DM can be further used in field operations.

The ball shape DM can be used to temporary plug fractures, perforation holes, screen casing which would fulfill the temporary plugging requirement of long well section or large thickness intervals among the productive layers According to the synthesis method mentioned previously, the following steps are included:

Heat the resin alloy or the nano resin alloy that are not synthesized by PCL and PBS to the temperature of 160-200° C. (optimized temperature is 160-180° C.); Heat the resin alloy or the nano resin alloy synthesized by PCL and PBS to the temperature of 100-125° C. (optimized temperature is 115-125° C.); Heat the PCL (can be vacuum mixing dried) or the mixture of PCL (can be vacuum mixing dried) and inorganic nanomaterial to the temperature of 60-75° C. (optimized temperature is 65-70° C.); Heat the PBS (can be vacuum mixing dried) or the mixture of PBS (can be vacuum mixing dried) and inorganic nanomaterial to the temperature of 100-125° C. (optimized temperature is 115-125° C.); Heat one of the PGA, PLA and PHA (can be vacuum mixing dried) or the mixture of one of the PGA, PLA and PHA (can be vacuum mixing dried) with inorganic nanomaterial to the temperature of 160-200° C. (optimized temperature is 160-180° C.). Pouring to the mold and produce the bar shape DM (different types of molds can be used and the cross section size of the bar is 100×100 mm), then treat (milling machine and lathe machine can be used) the bar shape DM to ball shape with diameter 20-80 mm. The ball shape DM can be further used in field operations.

According to the synthesis method discussed previously, the temperature of the one of the three polymers mixed with inorganic nanomaterials can be 5-10° C. higher than the melting temperature of the one of the three polymers. Further optimization temperature is 220-235° C. of the PGA with nano inorganic polymer mixture, 60-70° C. of the PCL with nano inorganic polymer mixture, 180-220° C. of the PLA with nano inorganic polymer mixture, 114-124° C. of the PBS with nano inorganic polymer mixture, 140-230° C. of the PHA with nano inorganic polymer mixture. The nano inorganic content is 0.01-3% of the total polymers by weight. Mixing extruder or reciprocating single screw mixer, etc. can be used to mix one kinds of raw materials and inorganic nanomaterial as mentioned previously to form the uniform mixture. Then wire drawing die (such as 3 mm wire drawing die) can be used to slice the mixture of the polymer and the inorganic nanomaterial. The slices shape DM can be manufactured to various shape after cooling.

According to the implementation of this invention as discussed previously, the preferred chain extender, which is used to synthesize the resin alloy with polymer and chain extender or with polymer, inorganic nanomaterial and chain extender and is manufactured to filaments or sheet shapes, is ADR-4300 which is the product of BASF SE and has three active epoxy group in each molecule. The content of chain extender is 0.1-5.0% of the total polymer by weight, further preferred content is 0.5-1.0% of the total polymer by weight. The preferred chain extender, which is used to synthesize the resin alloy with polymer and chain extender or with polymer, inorganic nanomaterial and chain extender tender and is manufactured to particles or globular shapes, is ADR-4370 which is the product of BASF SE and has nine active epoxy group in each molecule. The content of chain extender is 0.05-5.0% of the total polymer by weight, further preferred content is 0.1-0.3% of the total polymer by weight.

This invention selects PGA, PCL, PLA, PBS and PHA as raw materials, which contain hydroxyl and carboxyl, and these raw materials can react with the chain extender that contains active epoxy group. According to the reservoir conditions and the operation goals, two, three, four or five of the raw materials can be proportionally selected, and the chain extender with active epoxy group, such as the products of BASF SE (one or combinations of ADR-4300, ADR-4370, ADR4368 and ADR-4380), would be added. Resin alloy will be synthesized under certain melt mixing conditions, nano resin alloy can be also synthesized if inorganic nanomaterials are added.

Based on reservoir conditions and operation purpose, the resin alloy or the nano resin alloy or one of the PGA, PCL, PLA, PBS and PHA or the mixture of one of the PGA, PCL, PLA, PBS and PHA with inorganic nanomaterial can be manufactured to flake, powder, granule, ball and fiber shape, which can be further used to the oil and gas field operations. Since the operation fluid would be injected into the well bottom at the surface temperature during the operations, the formation temperature will be lowered because the surface temperature is lower than the formation temperature. The resin alloy is stabilized under the lower temperature condition, which will not degrade and will seal the formation. The working fluid will be unable to migrate to the formation and the formation damage will be mitigated. The amount of operation fluid will be reduced and the operation cost will be saved. The thermal energy of the formation will be transferred to the temporary plugging sections, which will increase the temperature of the temporary plugging section, then the DM will be fully degraded under certain time and temperature which will release the flow channel of the formation with zero formation damage.

On the other hand, this invention provides the degradable material that can be used to oil and gas field operations which can be manufactured by the synthesis methods discussed previously.

The degradable material can be manufactured to the suitable shapes based on the reservoir conditions and operation purpose. The advantages are listed as following: (1) the DM can be used to lower the invasion of operation fluid and mitigate the formation damage degree in the process of oil field operations such as drilling, completion, workover and well stimulation. (2) temporary plugging of the formation can be achieved, fluid invasion into the formation can be stopped which would reduce the formation damage degree. And the amount of the operation fluid will be reduced while the operation cost can be saved. (3) the thermal energy of the formation will be transferred to the temporary plugging sections and the DM can be degraded under certain the formation temperature in a certain time. The temporary plugging channel will be released with zero formation damage.

DESCRIPTION OF DRAWINGS

FIG. 1 is a process flow diagram for the preparation of the degradable materials according to Examples 1-6.

DETAILED DESCRIPTION OF INVENTION

In order to allow better understanding of the technical features, objectives and beneficial effects of the present invention, detailed description of the technical solutions of the present invention will be provided below, but should not to be construed as limiting the scope of the present invention.

EXAMPLE 1

This example provides a degradable material that can be used in the oil and gas field operations, as shown in FIG. 1, which can be synthesized as following:

(1) Mix and dry the PGA (WAMW is 90,000) slice at the temperature of 50-55° C., pressure of 90 kPa for 13 hours; Mix and dry the PCL (WAMW is 70,000) slice at the temperature of 100-105° C., pressure of 90 kPa for 4 hours; Mix and dry the PLA (WAMW is 100,000) slice at the temperature of 90-95° C., pressure of 90 kPa for 6 hours; Mix and dry the PBS (WAMW is 50,000) slice at the temperature of 70-75° C., pressure of 90 kPa for 9 hours; Mix and dry the PHA (WAMW is 60,000) slice at the temperature of 100-105° C., pressure of 90 kPa for 4 hours; make sure the water content is lower than 0.1% by weight, 0.01% by weight is preferred;

(2) Mix the dried PGA 150 kg, PCL 300 kg, PLA 200 kg, PBS 250 kg and PHA 100 kg in a stainless steel mixer with mixing plant under 50° C., 90 kPa, for 10 minutes.

(3) Add the mixture of PGA, PCL, PLA, PBS and PHA slices to the reciprocating single screw mixing extruder, then add 3 kg silicon dioxide with 10-20 nm diameter and 1.5 kg chain extender ADR-4370 (product of BASF SE). Heat the temperature to 210° C. under 8° C./min then conduct the melt mixing reaction for 10 minutes. The PGA/PCL/PLA/PBS/PHA resin alloy is synthesized.

(4) Slice the PGA/PCL/PLA/PBS/PHA resin alloy using 3 mm wire drawing die, then decrease the temperature to 30-45° C. The PGA/PCL/PLA/PBS/PHA resin alloy slice is manufactured.

(5) Powder the PGA/PCL/PLA/PBS/PHA resin alloy slice using plastic grinder, then control the mill plate temperature to −10-0° C. by nitrogen cooling method. Use 200 mesh (74 μm) to sieve 200 mesh (74 μm) PGA/PCL/PLA/PBS/PHA resin alloy powder and manufacture the powder shape degradable material.

The 200 mesh (74 μm) DM powder is used to conduct the temporary plugging experiment. Basic core sample data: core length: 5.14 cm, diameter 2.52 cm, the core permeability is $30.16 \times 10^{-3}$ μm$^2$ measured by standard salt water (NaCl: 7 wt %, CaCl$_2$: 0.6 wt % MgCl$_2$.6H$_2$O: 0.4 wt %) under 150° C. Add the 200 mesh (74 μm) PGA/PCL/PLA/PBS/PHA resin alloy powder to a steel mold in 2 cm height under room temperature, which is located at the injection side. Inject the standard salt water at the constant rate of 5mL/min and measure the pressure under 150° C. When the injection pressure is increased to 40 MPa, hold that pressure and the measured permeability is $0.15 \times 10^{-3}$ μm$^2$, indicating the permeability is lowered by 99.50% and the plugging effect is achieved. Shut the inlet and outlet of the core holder, heat the core for 24 hours under 150° C. Then measure the permeability of the core using standard salt water. The measured permeability is $28.85 \times 10^{-3}$ μm$^2$, 95.65% of the initial measured permeability, which indicates the powder shape DM is almost fully degradable.

EXAMPLE 2

This example provides a degradable material that can be used in the oil and gas field operations, as shown in FIG. 1, which can be synthesized as following:

(1) Mix and dry the PGA (WAMW is 30,000) slice at the temperature of 50-55° C., pressure of 90 kPa for 11 hours; Mix and dry the PCL (WAMW is 50,000) slice at the temperature of 100-105° C., pressure of 90 kPa for 4 hours; Mix and dry the PBS (WAMW is 30,000) slice at the temperature of 70-75° C., pressure of 90 kPa for 9 hours; Mix and dry the PHA (WAMW is 40,000) slice at the temperature of 100-105° C., pressure of 90 kPa for 4 hours; make sure the water content is lower than 0.1% by weight, 0.01% by weight is preferred;

(2) Mix the dried PGA 280 kg, PCL 320 kg, PBS 250 kg and PHA 150 kg in a stainless steel mixer with mixing plant under 50° C., 90 kPa, for 10 minutes.

(3) Add the mixture of PGA, PCL, PBS and PHA slices to the reciprocating single screw mixing extruder, then add 2 kg silicon dioxide with 10-20 nm diameter and 1.5 kg chain extender ADR-4370 (product of BASF SE). Heat the temperature to 210° C. under 9° C./min then conduct the melt mixing reaction for 9 minutes. The PGA/PCL/PBS/PHA resin alloy is synthesized.

(4) Slice the PGA/PCL/PBS/PHA resin alloy using 3 mm wire drawing die, then decrease the temperature to 30-35° C. The PGA/PCL/PBS/PHA resin alloy slice is manufactured.

(5) Granulate the PGA/PCL/PBS/PHA resin alloy using screw granulator at the temperature of 205° C., the diameter of the particles is 1-1.5 mm. Then decrease the temperature to 35° C. at 10° C./min decreasing rate. The 1-1.5 mm diameter particles is the particle shape DM.

The 1-1.5 mm diameter particle shape DM is used to temporary plug well D1 (productive formation interval is 3518-3523 m, temperature is 106° C., well leaking rate is 13 m$^3$/hour). The unsolid phase completion fluid (0.4% HEC by weight (hydroxyethyl cellulose QP -300-h, no viscosity, dow)+5 wt % KCL+10% 80 mesh (180 microns) of calcium carbonate powder) is used, and 112 kg 1-1.5 mm diameter particle shape DM is also added. The well bottom pressure is 7.5 MPa when the particle shape DM reached the well bottom. No leakage is observed which indicates the temporary plugging effect is obvious. After finish of other completion operations, the well was productive after 25 days, the temporary plugging particle shape DM of the interval has fully degradable.

EXAMPLE 3

This example provides a degradable material that can be used in the oil and gas field operations, as shown in FIG. 1, which can be synthesized as following:

(1) Mix and dry the PCL (WAMW is 60,000) slice at the temperature of 90-100° C., pressure of 90 kPa for 4 hours; Mix and dry the PBS (WAMW is 100,000) slice at the temperature of 70-75° C., pressure of 90 kPa for 9 hours; Mix and dry the PHA (WAMW is 50,000) slice at the temperature of 100-105° C., pressure of 90 kPa for 4 hours; make sure the water content is lower than 0.1% by weight, 0.01% by weight is preferred;

(2) Mix the dried PCL 100 kg, PBS 500 kg and PHA 400 kg in a stainless steel mixer with mixing plant under 50° C., 90 kPa, for 10 minutes.

(3) Add the mixture of PCL, PBS and PHA slices to the reciprocating single screw mixing extruder, then add 1.5 kg chain extender ADR-4370 (product of BASF SE). Heat the temperature to 206° C. under 8° C./min then conduct the melt mixing reaction for 7 minutes. The PGA/PBS/PHA resin alloy is synthesized.

(4) Slice the PGA/PBS/PHA resin alloy using 3 mm wire drawing die, then decrease the temperature. The PGA/PBS/PHA resin alloy slice is manufactured.

(5) Powder the PCL/PBS/PHA resin alloy slice using plastic grinder, then control the mill plate temperature to −10-0° C. by nitrogen cooling method. Use 80 mesh to sieve 80 mesh PCL/PBS/PHA resin alloy powder and manufacture the powder shape degradable material.

The powder shape DM is used to horizontal well D2 (well vertical depth 4000 m, well bottom temperature is 131° C., horizontal section length 870 m, acidizing stimulation is needed at the horizontal section) for the temporary plugging with uniformly acid acidizing treatment. The acid volume is 150 m$^3$, powder shape DM is 300 kg. The acidizing fluid composition is 15 wt % HCL+1.5 wt % of HF+2 wt % KMS+2 wt % DXJ -3-6 inhibitor acidification multi-effect additive powder for degradable materials+0.2 wt %. The acidizing fluid was injected through tubing with 1.2 m$^3$/min injection rate, the pump pressure was increased by 1.5 MPa with the constant injection rate, which indicated the acid was uniformly distributed. The well production rate was increased to 39.6 m$^3$/day comparing with the previous production rate 11.239.6 m$^3$/day, which means the effect of temporary plugging with uniform acid distribution was achieved.

EXAMPLE 4

This example provides a degradable material that can be used in the oil and gas field operations, as shown in FIG. 1, which can be synthesized as following:

(1) Mix and dry the PGA (WAMW is 20,000) slice at the temperature of 50-55° C., pressure of 90 kPa for 11 hours; Mix and dry the PCL (WAMW is 15,000) slice at the temperature of 95-100° C., pressure of 90 kPa for 4 hours; Mix and dry the PHA (WAMW is 50,000) slice at the temperature of 100-105° C., pressure of 90 kPa for 4 hours; make sure the water content is lower than 0.1% by weight, 0.01% by weight is preferred;

(2) Mix the dried PGA 500 kg and PCL 500 kg in a stainless steel mixer with mixing plant under 45° C., 90 kPa, for 10 minutes.

(3) Add the mixture of PGA and PCL slices to the reciprocating single screw mixing extruder, then add 2 kg silicon dioxide with 10-20 nm diameter and 1.2 kg chain extender ADR-4330 (product of BASF SE). Heat the temperature to 205° C. under 10° C./min then conduct the melt mixing reaction for 8 minutes. The PGA/PCL nano resin alloy is synthesized.

(4) Squeeze the melting PGA/PCL nano resin alloy using Reciprocating single screw mixing extruder at the temperature of 190° C., the roll the PGA/PCL nano resin alloy into slice with 0.3 mm thickness. Then decrease the temperature to 25° C. at 10° C./min decreasing rate. Shatter the DM into 5-10 mm flakes which is the slice shape DM.

The 5-10 mm slice shape DM is used to well D3 (leakage interval is 4167-4171 m, temperature is 130° C., well leaking rate is 20 m$^3$/hour, the well was leaked seriously and failed to drill) for the temporary plugging. The well head pressure was 12 MPa and held constant for 30 minutes. The drilling process was continued to 4190 m for the completion, no leakage, which indicated the plugging effect was achieved. The well was put into production (12 days from the plugging to well completion), and the production rate is 53 m$^3$/day which indicated the degradable ability was good.

EXAMPLE 5

This example provides a degradable material that can be used in the oil and gas field operations, as shown in FIG. 1, which can be synthesized as following:

(1) Mix and dry the PGA (WAMW is 60,000) slice at the temperature of 100-105° C., pressure of 90 kPa for 4.5 hours; Mix and dry the PHA (WAMW is 70,000) slice at the temperature of 100-105° C., pressure of 90 kPa for 4 hours; make sure the water content is lower than 0.1% by weight, 0.01% by weight is preferred;

(2) Mix the dried PGA 500 kg and PHA 500 kg in a stainless steel mixer with mixing plant under 50° C., 90 kPa, for 10 minutes.

(3) Add the mixture of PCL and PHA slices to the reciprocating single screw mixing extruder, then add 2 kg mixtures of silicon dioxide and titanium dioxide with 5-150 nm diameter (1.5 kg silicon dioxide and 0.5 kg titanium dioxide) and 1.5 kg chain extender ADR-4370 (product of BASF SE). Heat the temperature to 210° C. under 10° C./min then conduct the melt mixing reaction for 7 minutes. The PGA/PHA nano resin alloy is synthesized.

(4) Slice the PGA/PHA resin alloy using 3 mm wire drawing die, then decrease the temperature. The PGA/PHA nano resin alloy slice is manufactured.

(5) Conduct injection molding process to treat The PGA/PHA nano resin alloy slice using injection molding machine at the following conditions: feeding inlet temperature 25° C., constant crew speed 150 cycle/min, pressure 500 kPa, feeding inlet temperature 160° C., feeding temperature 160° C., metering section temperature 200° C., injection orifice temperature 205° C., mold temperature 25° C. The injection rate can be faster. Manufacture 8 mm diameter ball shape DM using 8 mm diameter mold, which can be further used to plug the perforation holes, screen casing, long well section and large intervals between the productive formations.

The 8 mm ball shape DM is used to plug the perforation holes and conduct the transverse fracturing at well B4 (fracture interval 6735-6742 m and 6789-6796 m, phase angle 60 degree, spiral perforation, 16 holes/m). Conduct the transverse hydraulic fracturing with tools by using 40 8 mm diameter balls. The pressure was increased by 7.5 MPa after the balls falling into the perforation holes which indicated better transverse ability between the formation intervals. The 8 mm diameter balls was degraded at 150° C. in 8 hours.

EXAMPLE 6

This example provides a degradable material that can be used in the oil and gas field operations, as shown in FIG. 1, which can be synthesized as following:

(1) Mix and dry the PCL (WAMW is 20,000) slice at the temperature of 50-55° C., pressure of 90 kPa for 6 hours; Mix and dry the PBS (WAMW is 15,000) slice at the temperature of 60-75° C., pressure of 90 kPa for 5 hours; make sure the water content is lower than 0.1% by weight, 0.01% by weight is preferred;

(2) Mix the dried PCL 800 kg and PBS 200 kg in a stainless steel mixer with mixing plant under 45° C., 90 kPa, for 7 minutes.

(3) Add the mixture of PCL and PBS slices to the reciprocating single screw mixing extruder, then add 1.5 kg chain extender ADR-43705 (product of BASF SE). Heat the temperature to 125° C. under 10° C./min then conduct the melt mixing reaction for 6 minutes. The PCL/PBS nano resin alloy is synthesized.

(4) Slice the PCL/PBS resin alloy using 3 mm wire drawing die, then decrease the temperature. The PCL/PBS nano resin alloy slice is manufactured.

(5) Add the PCL/PBS nano resin alloy to the vacuum resin casting machine under 90 kPa, increase the temperature to 120° C. at the temperature increasing rate 10° C./min Pure the melt the PCL/PBS nano resin alloy to the 70 mm diameter mold under vacuum condition, then decrease the temperature at 10° C./min Manufacture the 70 mm diameter products into 25.4 mm, 38.1 mm, 47.62 mm, 57.15 mm, etc. size ball shape DM, which can be used to open the sliding sleeve of the long wellbore sections.

The 38.1 mm, 47.62 mm, 57.15 mm ball shape DM is used to open the sliding sleeve of horizontal well D4 (well vertical depth 5320 m, fracturing interval 370 m). The fracture pressure was increased by 15-20 MPa when the ball reached the sliding sleeve. Layer sealing was successful, and the degradation debris was observed after 6-8 hours, no degradation debris was observed which indicated the ball had been fully degraded. It further proved that the laying and degradation effects were achieved.

The invention claimed is:

1. A method of synthesizing degradable material(s) (DM), comprising the following steps:
    performing a melt mixing reaction of a polymer and a chain extender in a reciprocating single-screw intermixing extruder to form a resin alloy, wherein the polymer comprises two, three, four or five polymer materials selected from polyglycolic acid (PGA), polycaprolactone (PCL), polylactic acid (PLA), poly (butylene succinate) (PBS) and poly(3-hydroxybutyrate) (PHA);
    cutting the resin alloy into resin alloy slices using a wire drawing die; and
    cooling the resin alloy slices to produce the DM, wherein the DM can be used in field operations.

2. The synthesis method of DM of claim 1, wherein the polymer comprises: 10-90% of the PGA and 10-90% of PCL; or 10-90% of the PGA and 10-90% of the PLA; or 10-90% of the PGA and 10-90% of PBS; or 10-90% of the PGA and 10-90% of PHA; or 10-90% of the PCL and 10-90% of PLA; or 10-90% of the PCL and 10-90% of PBS; or 10-90% of the PCL and 10-90% of the PHA; or 10-90% of the PLA and 10-90% of PBS; or 10-90% of the PLA and 10-90% of PHA; or 10-90% of the PBS and 10-90% of PHA; or 10-50% of the PGA, 10-40% of PCL and 10-50% of PLA; or 10-40% of the PGA, 10-50% of PCL and 10-40% of PBS; or 10-40% of the PGA, 10-50% of PCL and 10-40% of PHA; or 10-40% of the PGA, 10-50% of PLA and 10-40% of PBS; or 10-40% of the PGA, 10-40% of PLA and 10-40% of PHA; or 10-50% of the PGA, 10-40% of PBS and 10-40% of PHA; or 10-40% of the PCL, 10-50% of PLA and 10-40% of PBS; 10-40% of the PCL, 10-50% of PLA and 10-40% of PHA; or 10-60% of the PCL, 10-30% of PBS and 10-30% of PHA; or 10-40% of the PGA, 10-40% of PCL, 10-30% of PLA and 10-30% of PBS; or 10-40% of the PGA, 10-40% of PCL, 10-40% of PLA and 10-30% of PHA; or 10-40% of the PCL, 10-40% of PLA, 10-30% of PBS and 10-30% of PHA; or 10-40% of the PGA, 10-40% of PLA, 10-30% of PBS and 10-30% of PHA; or 10-40% of the PGA, 10-40% of PCL, 10-30% of PBS and 10-30% of PHA; or 10-40% of the PGA, 10-40% of PCL, 10-40% of PLA, 10-30% of PBS and 10-30% of PHA, and wherein % is based on mass.

3. The synthesis method of DM of claim 1, wherein the weight-average molecular weight (WAMW) of PGA is 5,000 to 150,000; the WAMW of PCL is 5,000 to 150,000; the WAMW of PLA is 5,000 to 150,000; the WAMW of PBS is 5,000 to 250,000; the WAMW of PHA is 5,000 to 80,000.

4. The synthesis method of DM of claim 1, further comprising the following steps: vacuum mixing and drying the polymer while holding the water content of PGA, PCL, PLA, PBS and/or PHA to less than 0.1% by weight;
    wherein the PGA is vacuum mixed and dried at a temperature of no higher than 120° C., the pressure is between 10 and 100 kPa, and the mixing and drying time is between 2 and 10 hours;
    wherein the PLC is vacuum mixed and dried at a temperature no higher than 60° C., the pressure is between 10 and 100 kPa, and the mixing and drying time is between 2 and 12 hours;
    wherein the PLA is vacuum mixed and dried at a temperature no higher than 105° C., the pressure is between 10 and 100 kPa, and the mixing and drying time is between 2 and 12 hours;
    wherein the PBS is vacuum mixed and dried at a temperature no higher than 90° C., the pressure is between 10 and 100 kPa, and the mixing and drying time is between 3 and 14 hours; and
    wherein the PHA is vacuum mixed and dried at a temperature no higher than 105° C., the pressure is between 10 and 100 kPa, and the mixing and drying time is between 2 and 12 hours.

5. The synthesis method of DM of claim 1, further comprising the following steps:
    adding inorganic nano-materials during the melt mixing reaction, thereby resulting in a synthesized resin nano alloy that can be used in the field operations as a DM, wherein the inorganic nano-materials are nano-silicon dioxide and/or nano-titanium dioxide with particle diameters in the range of 5-20 nm, and wherein the added nano-materials comprise 0.01%-3% of the total polymer by weight.

6. The synthesis method of DM of claim 1, wherein the chain extender contains an active epoxy group, and wherein the added chain extender comprises 0.05%-5.0% of the total polymer by weight.

7. The synthesis method of DM of claim 6, wherein the chain extender is selected from the group consisting of one or more of a chain extender having 3 active epoxy groups per molecule, a chain extender having 5 active epoxy groups per molecule, and a chain extender having 9 active epoxy groups per molecule.

8. The synthesis method of DM of claim 1, wherein:
    when the polymer materials are PGA and PCL, the melt mixing reaction temperature of the PGA and PCL is 200-300° C.;

when the polymer materials are PGA and PLA, the melt mixing reaction temperature of the PGA and PLA is 200-240° C.;
when the polymer materials are PGA and PBS, the melt mixing reaction temperature of the PGA and PBS is 205-240° C.;
when the polymer materials are PGA and PHA, the melt mixing reaction temperature of the PGA and PHA is 200-240° C.;
when the polymer materials are PCL and PLA, the melt mixing reaction temperature of the PCL and PLA is 200-230° C.;
when the polymer materials are PCL and PBS, the melt mixing reaction temperature of the PCL and PBS is 115-145° C.;
when the polymer materials are PCL and PHA, the melt mixing reaction temperature of the PCL and PHA is 200-230° C.;
when the polymer materials are PLA and PBS, the melt mixing reaction temperature of the PLA and PBS is 205-240° C.;
when the polymer materials are PLA and PHA, the melt mixing reaction temperature of the PLA and PHA is 205-240° C.;
when the polymer materials are PBS and PHA, the melt mixing reaction temperature of the PBS and PHA is 205-235° C.;
when the polymer materials are PGA, PCL and PLA, the melt mixing reaction temperature of the PGA, PCL and PLA is 200-230° C.;
when the polymer materials are PGA, PCL and PBS, the melt mixing reaction temperature of the PGA, PCL and PBS is 200-230° C.;
when the polymer materials are PGA, PCL and PHA, the melt mixing reaction temperature of the PGA, PCL and PHA is 200-230° C.;
when the polymer materials are PGA, PLA and PBS, the melt mixing reaction temperature of the PGA, PLA and PBS is 200-230° C.;
when the polymer materials are PGA, PLA and PHA, the melt mixing reaction temperature of the PGA, PLA and PHA is 200-230° C.;
when the polymer materials are PGA, PBS and PHA, the melt mixing reaction temperature of the PGA, PBS and PHA is 200-230° C.;
when the polymer materials are PCL, PLA and PBS, the melt mixing reaction temperature of the PCL, PLA and PBS is 200-230° C.;
when the polymer materials are PCL, PLA and PHA, the melt mixing reaction temperature of the PCL, PLA and PHA is 200-230° C.;
when the polymer materials are PCL, PBS and PHA, the melt mixing reaction temperature of the PCL, PBS and PHA is 200-230° C.;
when the polymer materials are PLA, PBS and PHA, the melt mixing reaction temperature of the PLA, PBS and PHA is 200-240° C.;
when the polymer materials are PGA, PCL, PLA and PBS, the melt mixing reaction temperature of the PGA, PCL, PLA and PBS is 200-230° C.;
when the polymer materials are PGA, PCL, PLA and PHA, the melt mixing reaction temperature of the PGA, PCL, PLA and PHA is 200-230° C.;
when the polymer materials are PCL, PLA, PBS and PHA, the melt mixing reaction temperature of the PCL, PLA, PBS and PHA is 200-230° C.;
when the polymer materials are PGA, PLA, PBS and PHA, the melt mixing reaction temperature of the PGA, PLA, PBS and PHA is 205-240° C.
when the polymer materials are PGA, PCL, PBS and PHA, the melt mixing reaction temperature of the PGA, PCL, PBS and PHA is 200-230° C.; and
when the polymer materials are PGA, PCL, PLA, PBS and PHA, the melt mixing reaction temperature of the PGA, PCL, PLA, PBS and PHA is 200-230° C.

9. The synthesis method of DM of claim 1, wherein the melt mixing reaction time is between 3 and 20 minutes.

10. The synthesis method of DM of claim 1, further comprising the following steps:
crushing the resin alloy slices into a powder using a plastic grinder having a grinding plate;
cooling the powder with liquid nitrogen, wherein the grinding plate temperature is between −10° C. and 0° C.; and
screening the powder to between 40 mesh and 200 mesh, wherein the screened powder is the DM which can be used in field operations.

11. The synthesis method of DM of claim 1, further comprising the following steps:
pelleting the resin alloy slices using a pelletizer at a temperature of 160° C.-205° C. if the resin alloy is not synthesized from PCL and PBS, or pelleting the cooled resin alloy slices using a pelletizer at a temperature of 110° C.-120° C. if the resin alloy is synthesized from PCL and PBS; and then
cooling the resulting pellets to 15° C.-35° C.,
wherein the diameter of the pellets is selected from the group consisting of 0.8-1 mm, 1-1.5 mm, 1.5-2 mm, 2-2.5 mm, 2.5-3 mm, and 3-5 mm, and wherein the pellets are the DM that can be used in field operations.

12. The synthesis method of DM of claim 1, further comprising the following steps:
heating the resin alloy slices to a temperature of 190° C.-210° C. if the resin alloy is not synthesized from PCL and PBS, then conducting a stretching-setting treatment on the heated resin alloy slices at a temperature of 65° C.-90° C. using a melt-spinning machine; or
heating the resin alloy slices to a temperature of 110° C.-120° C. if the resin alloy is synthesized by PCL and PBS, then conducting a stretching-setting treatment on the heated resin alloy slices at a temperature of 40° C.-60° C. using a melt-spinning machine,
thereby resulting in a fiber which is the DM that can be used in field operations, wherein the length of the fiber is 2 mm-15 mm and the diameter of the fiber is 15-150 microns.

13. The synthesis method of DM of claim 1, further comprising the following steps:
heating the resin alloy slices to a temperature of 160° C.-200° C. in an injection molding machine if the resin alloy is not synthesized from PCL and PBS; producing a ball-shaped DM with a diameter of 4-15 mm under flowing conditions at a constant screw speed of 100-175 cycle/min, a pressure of 300-700 kPa, a feeding inlet temperature of 20° C.-25° C., a feeding temperature of 150° C.-160° C., a metering section temperature of 190° C.-210° C., an injection orifice temperature of 190° C.-210° C., and a mold temperature 20° C.-25° C.; or
heating the resin alloy slices to a temperature of 110° C.-120° C. in an injection molding machine if the resin alloy is synthesized from PCL and PBS; producing a ball-shaped DM with a diameter 4-15 mm under flowing conditions at a constant crew speed of 100-175 cycle/min, a pressure of 300-700 kPa, a feeding inlet temperature of 20° C.-25° C., a feeding temperature of 100° C.-110° C., a metering section temperature of 110° C.-120° C., an injection orifice temperature of 110° C.-120° C., and a mold temperature of 20° C.-25° C., wherein the ball-shaped DM can be used in field operations.

14. The synthesis method of DM of claim 1, further comprising the following steps:

heating the resin alloy slices to a temperature of 160° C.-200° C. if the resin alloy is not synthesized from PCL and PBS, or heating the resin alloy slices to a temperature of 100° C.-125° C. if the resin alloy is synthesized from PCL and PBS; and pouring the heated alloy into a mold to produce bar-shaped DM; and then treating the bar-shaped DM to produce ball-shaped DM with a diameter of 20 mm-80 mm, wherein the ball-shaped DM can be used in field operations.

15. A method of synthesizing degradable material(s) (DM), comprising the following steps:

performing a melt mixing reaction of a polymer and a chain extender to form a resin alloy, wherein the polymer comprises two, three, four or five polymer materials selected from polyglycolic acid (PGA), polycaprolactone (PCL), polylactic acid (PLA), poly (butylene succinate) (PBS) and poly(3-hydroxybutyrate) (PHA);

crushing the resin alloy to slices having a thickness of 0.1-0.3 mm at a temperature of 160° C.-190° C. if the resin alloy is not synthesized from PCL and PBS; or crushing the resin alloy to slices having a thickness of 0.1-0.3 mm at a temperature of 100° C.-110° C. if the resin alloy is synthesized from PCL and PBS;

lowering the temperature of the slices to 15° C.-35° C.; and then crushing the slices into cyclic-shaped DM having a diameter of 5-10 mm, or crushing the slices into approximately square- or triangle-shaped DM with side lengths of 5-%10 mm, wherein the DM can be used in field operations.

* * * * *